Jan. 12, 1937.　　　　S. S. MILLEN　　　　2,067,641
BEAD FORMING MACHINE
Filed Oct. 11, 1935　　　7 Sheets—Sheet 1
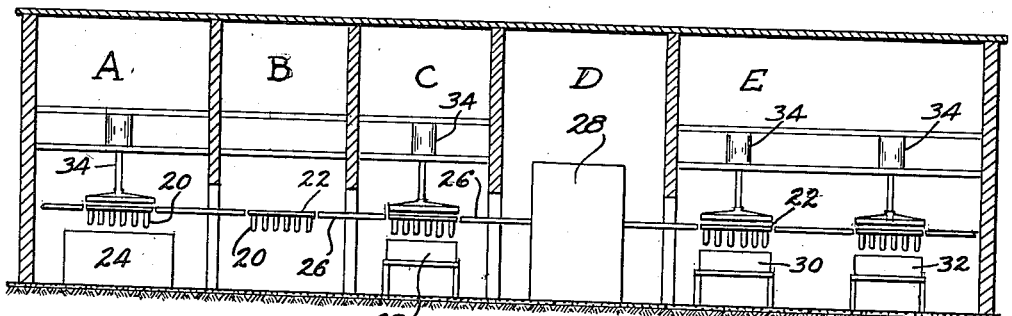
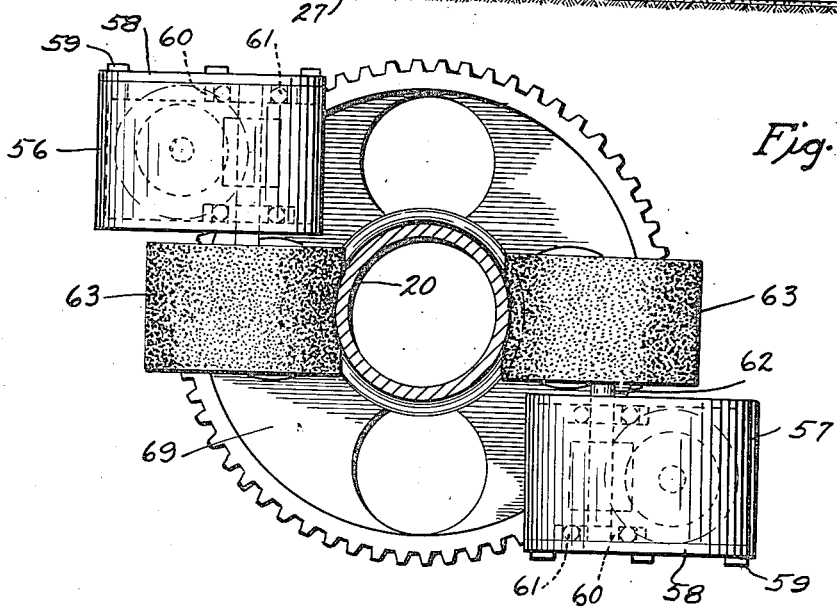
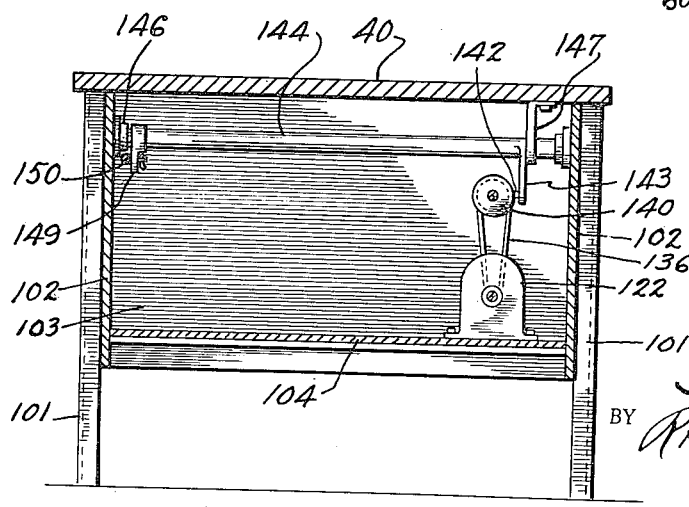
INVENTOR.
Stanley S. Millen
BY Robert S. Woolsey
ATTORNEY.

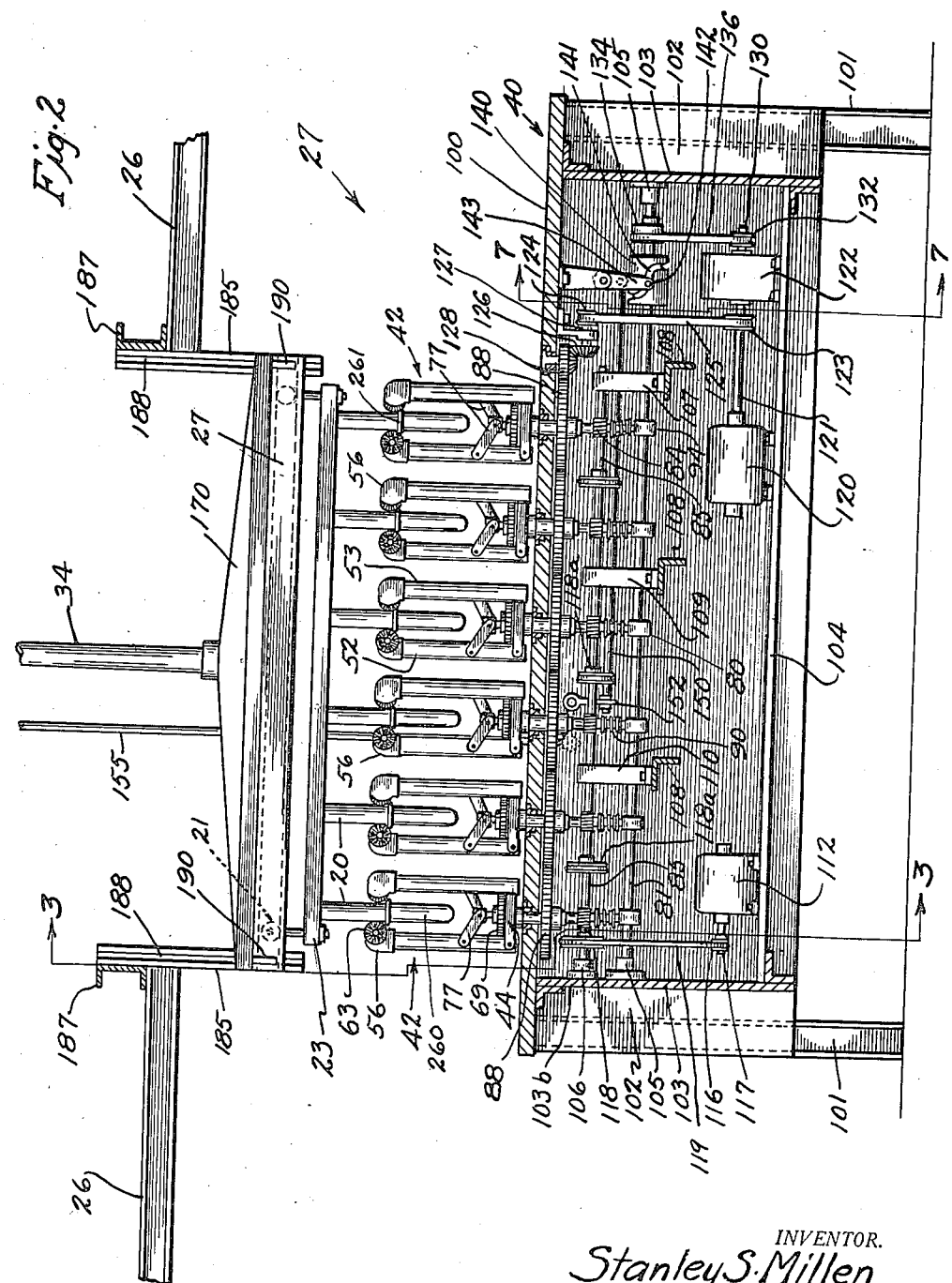

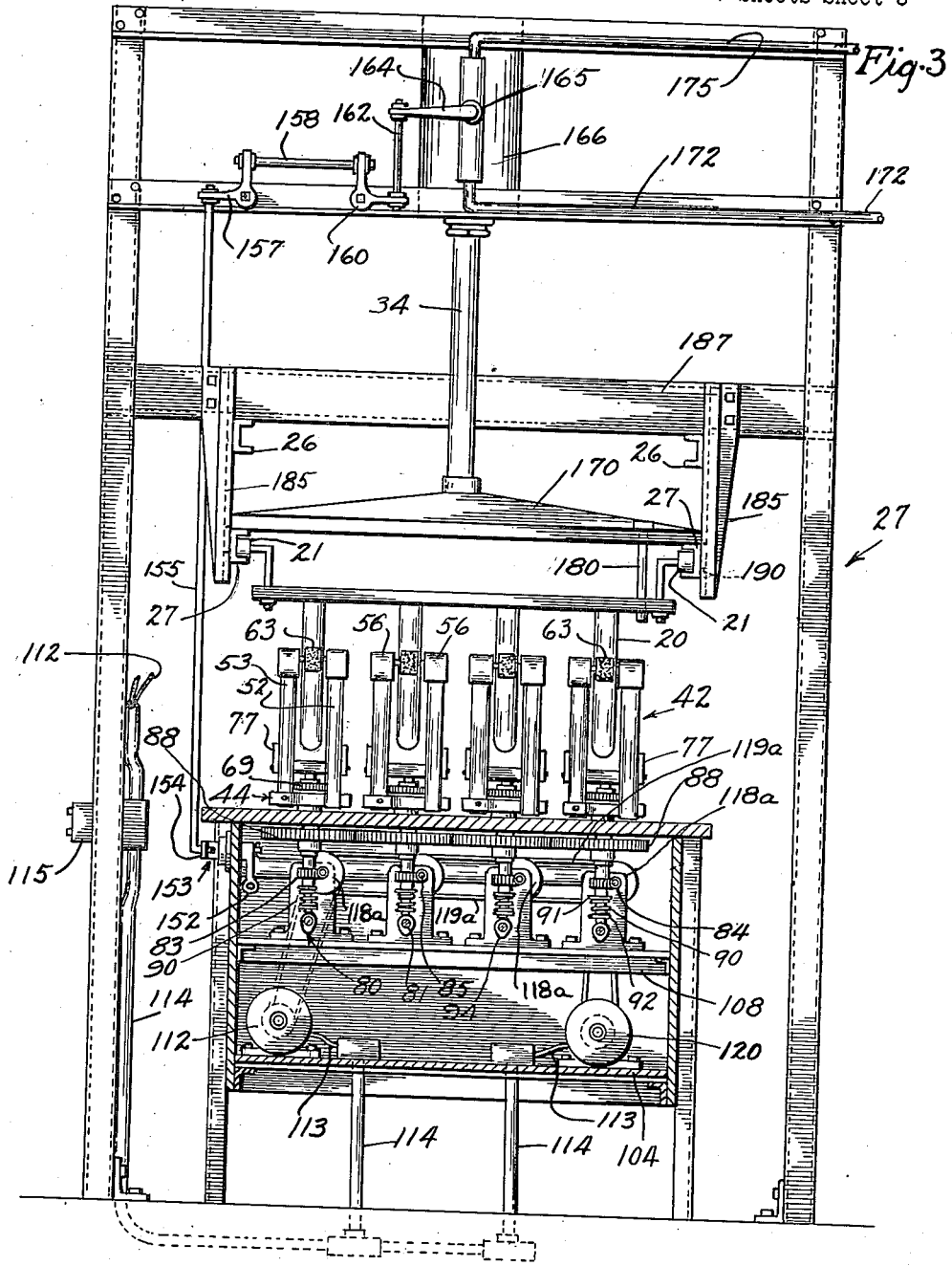

Jan. 12, 1937.  S. S. MILLEN  2,067,641
BEAD FORMING MACHINE
Filed Oct. 11, 1935  7 Sheets-Sheet 4
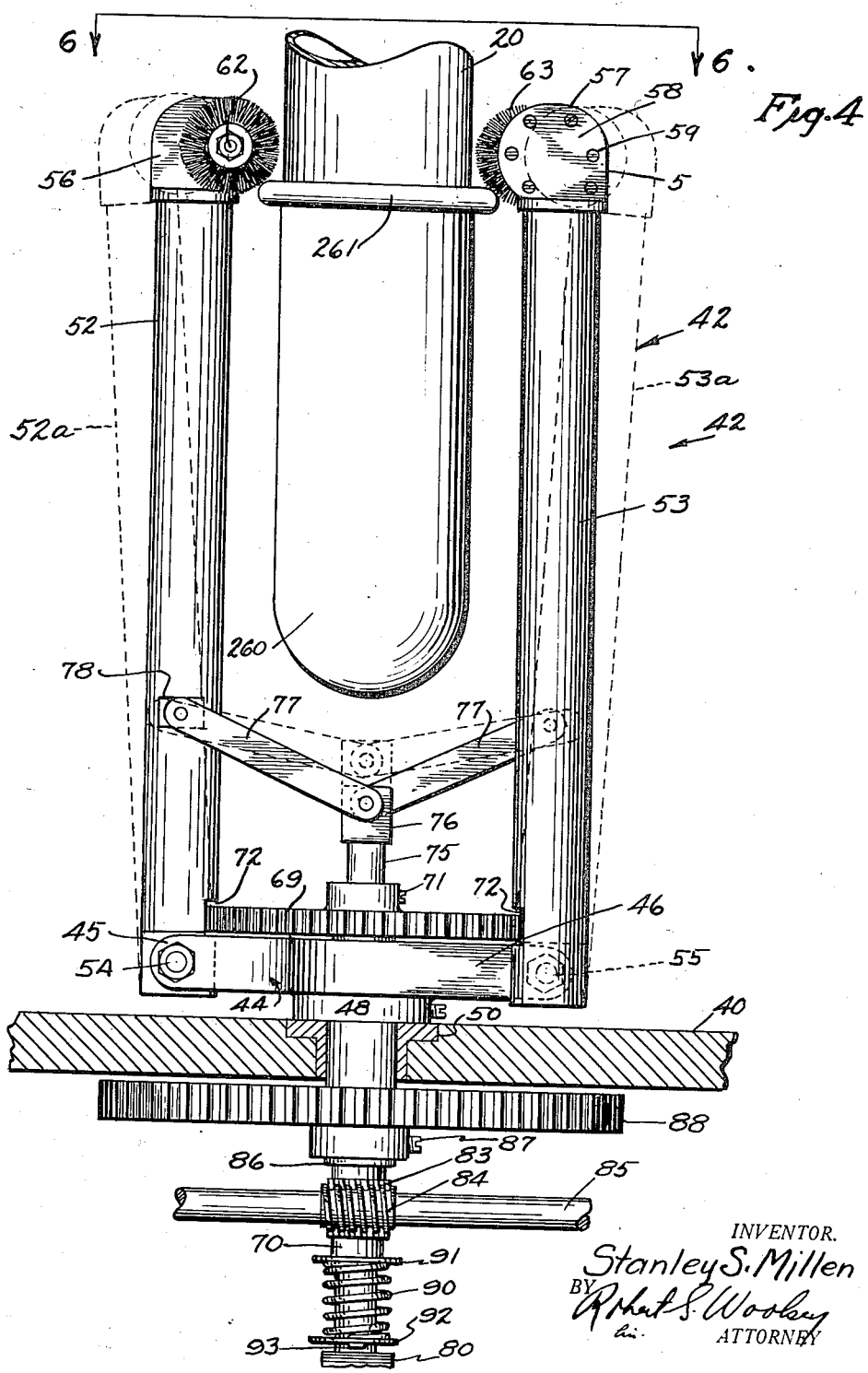

Jan. 12, 1937.                S. S. MILLEN                2,067,641
                          BEAD FORMING MACHINE
                          Filed Oct. 11, 1935          7 Sheets-Sheet 6
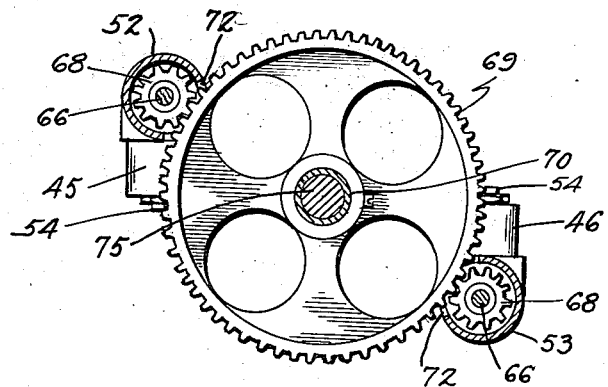
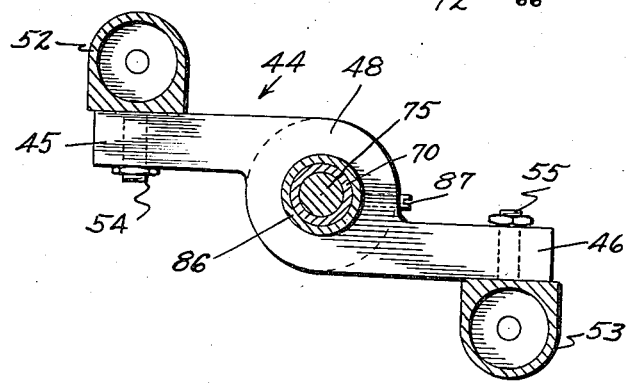
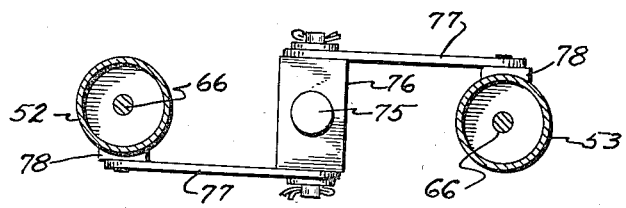
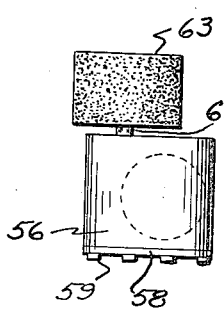
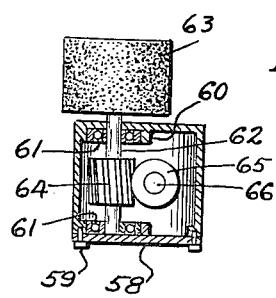
INVENTOR.
Stanley S. Millen
BY Robert S. Woolsey
ATTORNEY.

Jan. 12, 1937.　　　S. S. MILLEN　　　2,067,641
BEAD FORMING MACHINE
Filed Oct. 11, 1935　　　7 Sheets-Sheet 7
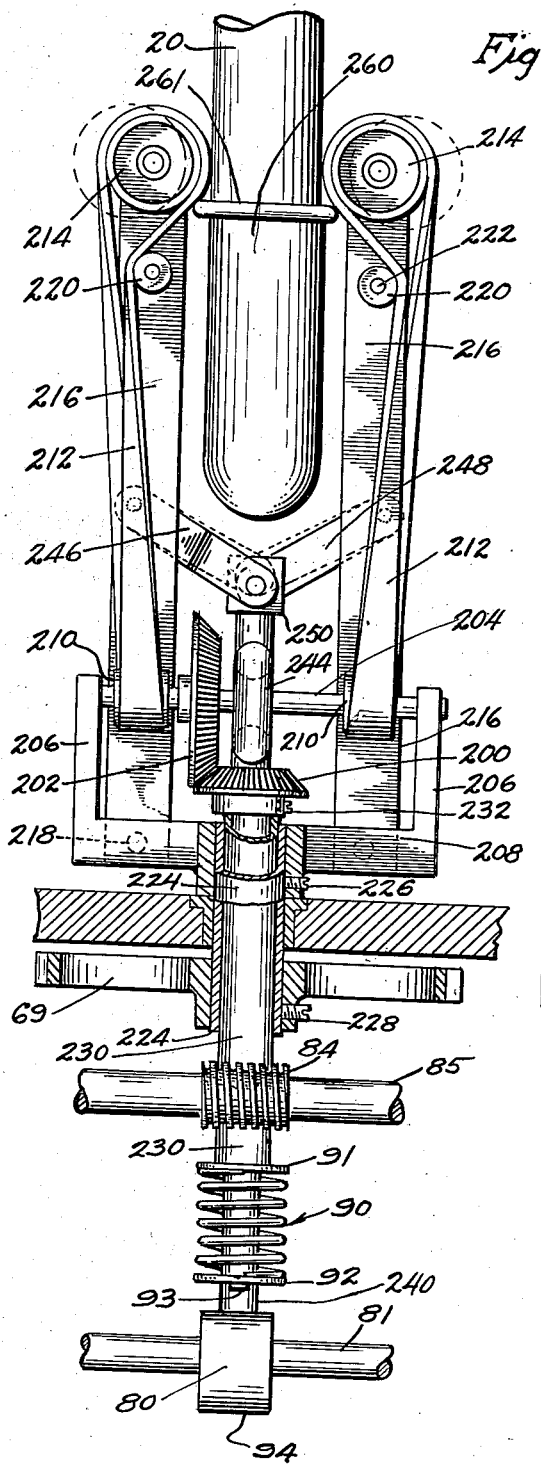
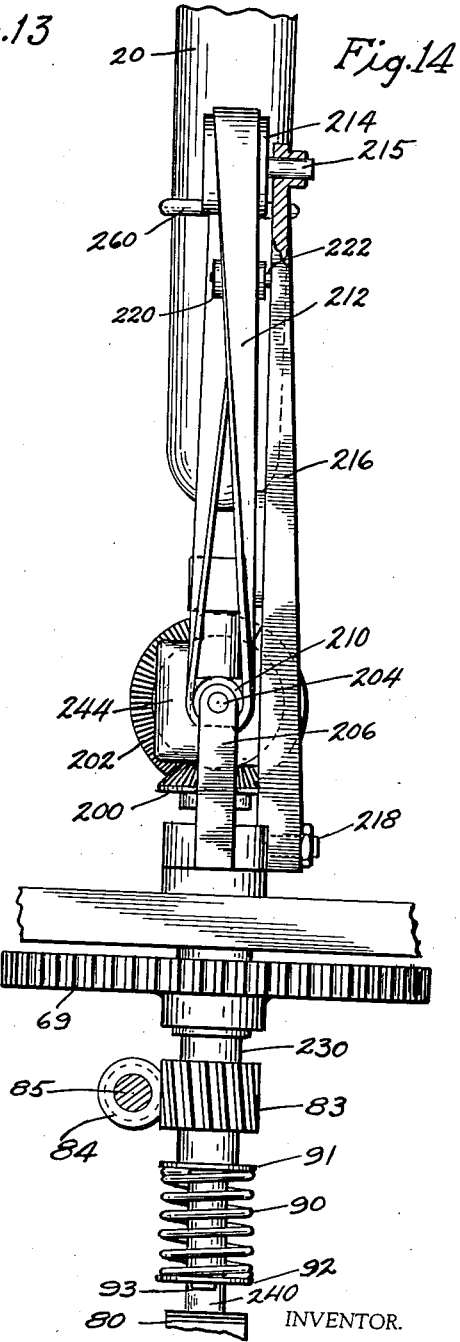
INVENTOR.
Stanley S. Millen
BY Robert S. Woolsey
ATTORNEY.

Patented Jan. 12, 1937

2,067,641

UNITED STATES PATENT OFFICE 2,067,641

BEAD FORMING MACHINE

Stanley S. Millen, Glendale, Calif., assignor to Julius Schmid, Los Angeles, Calif.

Application October 11, 1935, Serial No. 44,555

17 Claims. (Cl. 18—2)

This invention relates to mechanical means to form an annular bead around the open end of numerous devices, such as finger cots, nipples, toy balloons, etc., made of rubber and/or other compositions, wherein the article formed takes its shape from that of a form which is dipped into a bath of liquid rubber or other medium, the body of the article being formed by that part of the liquid composition which adheres to the form after dipping.

Prior art shows that the bead or ring forming machines, per se, are not new, and a number of patents have issued for machines to form annular beads, but insofar as applicant is aware, prior art does not show or suggest the novel means hereinafter to be disclosed to form an annular bead, for in most of the machines heretofore developed both the work and the bead forming brushes rotate, whereas in applicant's machine the work is held stationary, insofar as rotation about its vertical axis is concerned, while brushes or other bead forming means not only rotate about their axis but simultaneously rotate in a circular path around the stationary forms.

It is therefore a prime object of the present invention to provide a bead forming machine, wherein the work is non-rotatable and is not movable laterally but is movable in vertical directions, during which interval revolving brushes rotate around the medial vertical axis of the work and in contact therewith.

A further object of the invention is to provide in combination with a bead forming machine wherein the work is non-rotatable and not movable laterally, but is movable in vertical directions while revolving brushes rotate around the medial vertical axis of the work and in contact therewith, means operating in timed sequence to permit the placement of the work prior to processing and subsequently operating means to remove the work after being processed.

A still further object of the invention is to provide a machine capable of forming a bead on work, which machine is simple of design, positive in operation, of few parts, does not require expert attendance, as it is automatic in its operation, and which produces superior results.

Another object of the invention consists in the novel and useful provision, formation, construction, association, and relative arrangement of parts, members and features, all as shown in certain embodiments in the accompanying drawings, described generally, and more particularly pointed out in the claims.

A still further object of the invention is to provide a machine wherein a greater number of articles may be beaded or ringed in one operation than has heretofore been possible, while simultaneously reducing the cost of each device without impairing quality.

Other objects, features and advantages may be apparent from a study of the accompanying drawings, detailed description and the appended claims.

In reference to the drawings of which there are seven (7) sheets.

Figure 1 is a schematic view showing the several steps employed in forming ringed articles of the character herein contemplated, the steps or stages employed are, dipping, drying, bead forming or ringing, vulcanizing, stripping and form washing, of these phases of operation this invention is only concerned with the means to form an annular bead or ring, or that position in the figure indicated by the letter "C".

Figure 2 is a side elevation of the machine of this invention, a portion of the lower supporting structure being broken away to better illustrate detailed construction.

Figure 3 is an end elevation taken on line 3—3, Figure 2, the view is partially in section to better illlustrate detailed construction.

Figure 4 is a detail showing one of the bead forming units.

Figure 6 is a plan view of one of the bead forming units, taken on line 6—6, Figure 4, and drawn on a slightly exaggerated scale.

Figure 7 is a view in section taken on line 7—7, Figure 2, showing the cam and the means employed to translate the motion of the cam to control the form elevating means.

Figure 8 is a detail taken on line 8—8, Figure 5.

Figure 9 is a detail taken on line 9—9, Figure 5.

Figure 10 is a detail taken on line 10—10, Figure 5.

Figure 11 is a plan view of one of the revolving brushes and its support.

Figure 12 is a detail taken on line 12—12, Figure 5.

Figure 13 is a view in elevation showing one of the bead forming units, wherein a traveling belt has been substituted for revolving brushes.

Figure 14 is a side elevation of the modified form of construction described in Figure 13.

Figure 5:
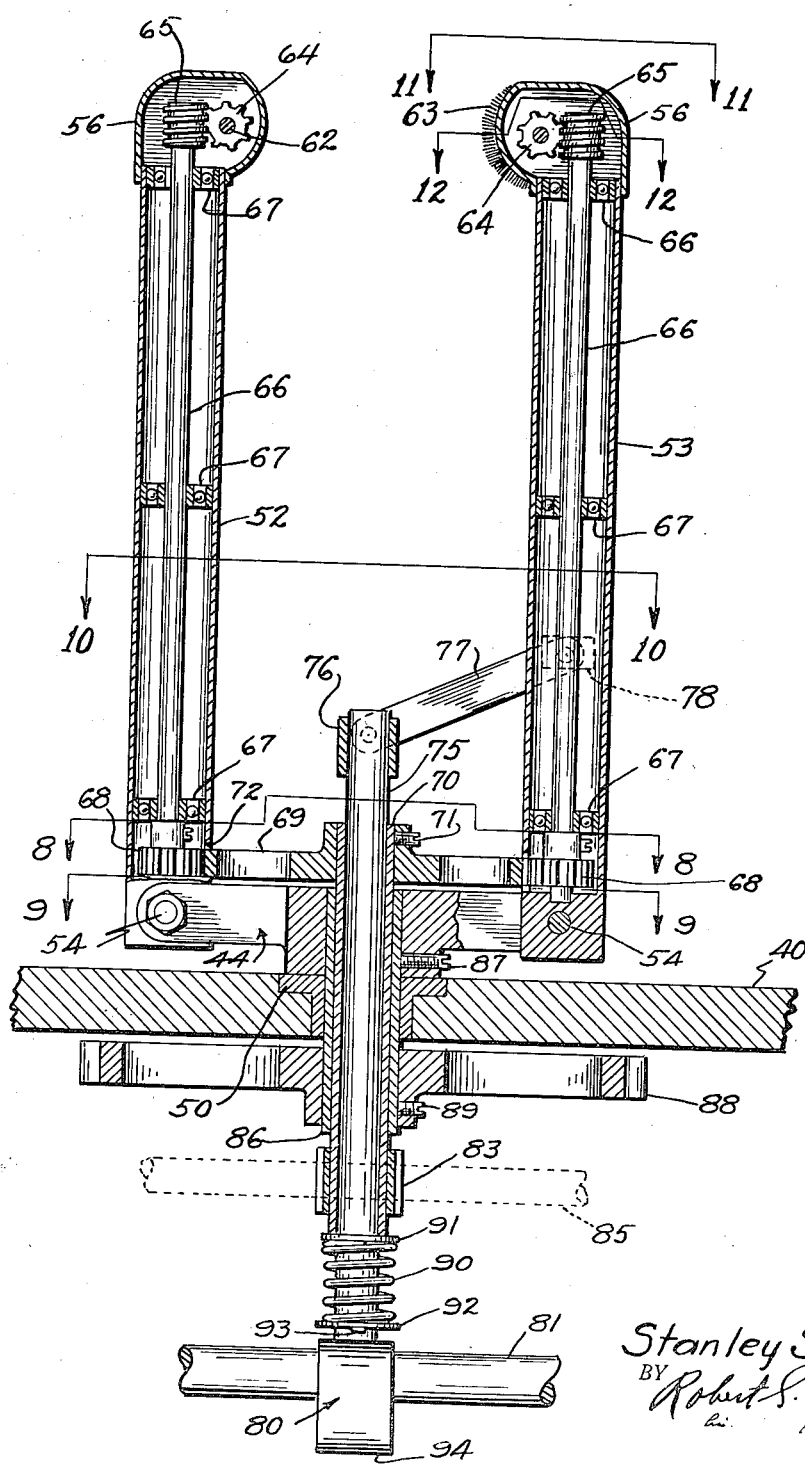
Figure 5 is an elevation in section, of one of the bead forming units showing the means employed to obtain the several motions used in forming the beaded product of this machine.

The machine of this invention performs one function in a series of operations, which follow one another in logical order and in timed sequence, and, as will be hereinafter disclosed, is designed to form an annular bead or ring on thin rubber articles such as toy balloons, nipples, finger cots, etc.

The manufacture of such articles, as above mentioned, contemplates the use of portable forms 20, shaped in the image of the article to be manufactured. The forms are grouped together on boards 22 and are then dipped in a solution usually of rubber located in tank 24, see section "A", Figure 1, after the required amount of rubber has been accumulated on the forms by one or more dippings, the coating on the forms 20 is permitted to dry as is schematically shown in section "B" of Figure 1. After the coating on the forms 20 has dried the forms 20 and the forms supporting boards 22 are moved along an overhead 26 to the machine 27 which forms the basis of this invention and which is schematically shown in section "C", Figure 1. After the beads have been formed, the forms and boards are moved to a vulcanizing chamber 28 in section "D", Figure 1, where the rubber coating on the forms is cured. After vulcanizing the forms are moved to a stripping machine 30 located in section "E", Figure 1, here the articles manufactured are stripped from the forms 20, which then move to a scrubbing machine 32 where the surface of the form is thoroughly cleansed prior to being returned to the point of beginning, section "A", for further dipping in the liquid rubber contained in tank 24.

Mechanical elevating means, as a hydraulic piston 34, is adapted to greatly eliminate manual effort, as well as function with precision, not only in the dipping operation but in the subsequent phases of operation wherein the forms are moved from an overhead transport to a processing or other work station.

The foregoing description is merely historical and is only intended to help develop a better conception of the purpose and intended use to which the machine of this invention is to be put.

I will now take up in detail the description of the machine itself and of its operation.

The machine of this invention, as will be apparent from a study of Figures 2 and 3, essentially comprises a table 40 upon which are mounted a plurality of bead forming units 42, while beneath the table such mechanical means as may be necessary to operate the bead forming units are located, while overhead, I have placed mechanical means operating in timed unison with the machine as a whole to effect the placement of, and withdrawal of the work or articles to be processed.

In taking up the description of the construction of this machine, I will start with one of the bead forming units 42 of which there may be an indefinite number, to be followed by a description of necessary corelated and dependent structure.

By referring to Figures 4 and 5 it will be seen that the base of the unit 42 is a spider 44 having arms 45 and 46 and a hub 48 which rotates upon a flanged base or bearing 50 seated in the table 40.

Tubular housings 52 and 53 are hinged to the respective arms 45 and 46 of the spider 44 by means of pins 54 and 55 and extend upwardly in parallel position. The upper ends of the housings 52 and 53 are capped with suitably shaped, closed gear housings 56 which are clearly illustrated in Figures 5, 6, 11 and 12.

As shown particularly in Figure 12 the housings 56 are formed with an open side which is normally closed by means of a plate 58, held in position by cap screws 59. Bearing race ways 60 in the housings 56 are adapted to receive ball bearings 61 which journal a transversely extending shaft 62 upon the free end of which is mounted, as a preferred bead foming means, a brush 63, while upon that part of the shaft which lies between bearings 61, I place a worm gear 64 which is in mesh with a second worm gear 65 secured upon the upper end of a vertical shaft 66 which is rotatable in bearing 67 located within tubular housings 52 and 53. The lower end of shaft 66 is fitted with a pinion gear 68 which is in mesh with a second pinion gear 69 keyed to a freely rotatable sleeve 70 by means of a set screw 71. Gears 68 and 69 are meshable by reason of the fact that a section of the tubular housings 52 and 53 is cut away at 72 to permit gear engagement.

A vertical shaft 75 is freely movable within the sleeve 70 and is provided with a cross member 76 to which are pivoted laterally extending arms 77, the opposite ends of which are hinged to bosses 78 upon the tubular housings 52 and 53. The lower end of shaft 75 rests upon a cam 80, driven by shaft 81. The sleeve 70 is provided with a gear 83 which is shrunk or otherwise secured thereon and which is in mesh with a driving gear 84 driven by shaft 85.

An extensile spring 90 encircles the lower end of shaft 75 and lies between disks 91 and 92. The disk 91 abuts the lower end of sleeve 70 while disk 92 rests upon a keeper 93. The purpose of the spring 90 being to return the shaft 75 after the lobe 94 of cam 80 has passed from contact with shaft 75. The spider 44 is primarily mounted upon a sleeve 86, within which the sleeve 70 is rotatable, the spider 44 being secured to the sleeve 86 by means of a set screw 87. A gear 88 is secured to the sleeve 86 by means of a set screw 89.

The foregoing is descriptive of the construction of one of the bead forming units 42. I will now describe the construction and arrangement of interrelated and associated supplemental mechanism.

As previously stated, the several bead forming units rest upon table 40. The table is provided with a flat surface member 100, supported upon legs 101 and having side plates 102, end plates 103—103b, and a base member 104.

The cam shaft 81 extends the length of the table and is journalled at its ends in bearings 105 which are secured to the end plates 103 and 103b. The gear shaft 85 also extends substantially the length of table 40 and has one end journalled in a bearing 106 secured to the end plate 103b, while its opposite end is journalled in bearing 107 which rests upon a transversely extending support 108 secured to side members 102. The bearing 107, as well as bearings 109 and 110 journal the cam shaft 81 at points intermediate the end bearings 105. The bearings 109 and 110 also journal the gear shaft 85 at points intermediate the end bearings 106 and 107. It will thus be seen that the cam shaft 81 and the gear shaft 85 are provided with adequate support to enable them to function in a manner to be hereinafter described.

An electric motor 112, mounted upon base member 104 is connected through wiring 113 located in conduit 114 with a switch 115, which is adapted to open and close an electric circuit to a source of power not shown, as it forms no part of the present invention. The motor is provided with a belt drive operating over pulley 116 on motor shaft 117, to a pulley 118 located on gear shaft 85, whereby said shaft is driven to rotate gears 84 and 83 to rotate sleeve 70 and gears 69 and 68 and through said gears to effect rotation of bead forming brushes 63. Pulleys 118a mounted upon gear shaft 85 and having overrunning belts 119a, are adapted to operate each of the several gear shafts 85, as shown in Figures 2 and 3 of the drawings, or separate motor drives may be used to operate each of the several shafts 85.

A second electric motor 120 also located upon base member 104 is connected in parallel with the electric circuit that provides power for motor 112 so that switch 115 closes the circuit to operate both motors simultaneously.

Motor 120 through drive shaft 121 is connected with a speed reducing device 122. A pulley 123 located on shaft 121 is operatively connected to pulley 124 by means of a belt 125. The pulley 124 through shaft 127 turns bevel gear 126 which, in turn, drives spur gear 128 and gears 88, all of which are in train, and which through sleeve 86 rotate spiders 44 to rotate the brushes 63 around the medial vertical axis of the forms 20.

A stub shaft 130 is provided with a pulley 132 and is connected with a pulley 134 on cam shaft 81 by means of a belt 136. Cam shaft 81 rotates once during each complete operation of the machine and is provided with a cam 140. A cam way 141 is provided with a cam follower 142, upon crank 143, located upon a transversely extending bar 144 which is journalled in bearing 146 and bracket 147. A lever 149 is mounted upon the opposite end of bar 144 and adapted to throw a link 150 which extends forwardly to an arm 152 of a bell crank 153, while arm 154, of bell crank 153, located upon the opposite side of side plate 102, is connected through link 155 with a bell crank 157, thence through link 158 to a second bell crank 160 to link 162 which operates valve control arm 164 to control the inlet of fluid under pressure to power cylinder 166, where, acting upon a piston, not shown, and a piston rod 34, an overhead structure 170 is raised and/or lowered in synchronous relation to the operation of the remainder of the machine.

A fluid inlet pipe 172 connected to a source of supply not shown in the drawings, but preferably oil under pressure, conducts the fluid to the power cylinder 166, from which it may be exhausted through pipe 175.

As mentioned previously, the present machine is but one of a series, and each of the machines in the line of operation or each of the several stations in the line of operation are connected by means of an over-head rail system 26, so that the frame 23 carrying a plurality of form boards may be readily moved from station A—B—C—D or E without inconvenience or loss of time.

However, when the frames are advanced to the movable over-head structure or elevator 170, it is necessary that the frame stop at a point immediately above the machine, for it is necessary that the medial vertical center of the forms 20 be aligned with the medial vertical center of the operating surfaces of the revolving brushes 63, so that when the structure 170, and the frame 23 are lowered the forms will be properly placed for processing action of the brushes 63. To affect this alignment, I show a pin 180 as a means to secure the frame to the over-head for such alignment, although other means to affect such an interlocked relation may also be adopted.

As a further means to guide the structure 170, I provide guideways, secured to structural cross members 187. A slot 188 in guide 185 is adapted to guide a lug 190 mounted upon the structure 170. It will thus be apparent that the frames are not only aligned with respect to the structure 170 but that the elevator 170 is also aligned with respect to the operating units 42 on the table 40.

In Figures 13 and 14, I show a modified form of bead forming unit. In this arrangement the bevel gear 200 occupies the position of the gear 69 in the other form of construction. Gear 200 is in mesh with gear 202 mounted upon shaft 204 which is journalled in upright brackets 206 formed as an integral part of the spider 208. Shaft 204 carries pulleys 210 which are connected with pulleys 214 by means of bead forming belts 212. Pulleys 214 are rotatably mounted upon standards 216 oscillatable upon pin 218 in relation to the spider 208. An idler 220 mounted upon pin 222 on standards 216 is adapted to curve the belt 212 from contact with the form 20 at those points where damage would otherwise be wrought upon the article being formed.

A sleeve 224 corresponds to sleeve 86 in the previously described form of construction and is keyed to the spider 208 by means of a set screw 226. Sleeve 224 extends downwardly and is secured by means of a set screw 228 to a gear wheel 69.

A second sleeve 230 which corresponds to sleeve 70 in the previously described construction supports bevel gear 200 which is keyed thereto by means of a set screw 232, the lower end of sleeve 230 carries worm gear 83 in mesh with gear 84 mounted upon shaft 85.

A central shaft 240 operable within sleeve 230 rests upon cam 80 mounted upon cam shaft 81. A spring 90 encircles its lower end and is positioned between disks 91 and 92. Disk 91 rests against the lower end of sleeve 230, while disk 92 rests upon a keeper 93. The purpose of the spring being, as in the other form of construction, to cause the shaft 240 to follow the cam 80 after cam lobe 94 has passed from under shaft 240.

The shaft 240, at a point above bevel gear 200, is formed with a bend 244 to avoid coinciding with pulley shaft 204. Laterally extending arms 246 and 248 are hinged to a cross member 250 fixed to the free end of shaft 240, and are in hinged relation to the standards 216.

It will thus be apparent that as cam 80 rotates and its lobe 94 lifts shaft 240, lateral arms 246 and 248 will be forced outwardly to cause standards 216 to move divergently, or from form 20, and the article 260 being processed upon the form. In timed sequence, spring 90 will cause the standard 216 and pulleys 214 together with bead forming belt 212 to return to operative, or bead forming position.

Prior to bringing the machine of this invention into operation, it is necessary to dip the forms 20 into a bath of liquid rubber, as is schematically illustrated in station A of Figure 1. After a sufficient amount of rubber has been built upon the forms 20 by one or more dippings, the forms are permitted to dry, as shown at station B of Figure 1, after drying, the forms 20 and frames 23 supported on casters 21 are rolled along an over-head track 26 to movable track section 27 which forms a part of the over-head structure or elevator 170.

The machine shown in Figures 2 and 3 is designed to operate synchronously in all respects, and although automatic means are not shown in the drawings whereby frame 23 is advanced to position in alignment with the medial vertical center of the bead forming brushes 63, such a development may be employed, however, for the purpose of completing this illustration it will be assumed that an operator has manually moved the frame 23 to position and by means of pin 180 aligns and locks frame 23 and over-head 170 so that medial vertical axis of each of the forms 20 are aligned with the vertical center and inner working surface of the bead forming brushes 63.

It will now be assumed that motors 112 and 120 are running, and that motor 120 operating through shaft 121, speed reducer 122, and belt 136 turns cam shaft 81 thereby rotating cams 80 and lifting shaft 75 to force arms 77 outwardly and upwardly, as shown in Figure 4, causing tubular housings 52 and 53 to move divergently to approximate position shown by dotted lines 52a and 53a.

Simultaneously therewith, cam 140 on cam shaft 81 carries cam follower 142 along cam way 141, and acting through crank 143, bar 144, link 150, bell crank 153, link 155, bell crank 157, link 158, bell crank 160, link 162 and valve throw arm 164 operates valve 165 to admit fluid under pressure to act upon a piston and piston rod 34 to force the elevator 170 downwardly so that forms 20 lie between spreaded bead forming brushes 63.

(A) During this interval the cam shaft 81 has continued to turn and by the time the forms 20 have reached their lower-most position cam lobe 94 has passed from under shaft 75, permitting spring 90 to force the brushes 63 to operative position, by reason of the fact that spring 90 reverses the forces that were previously set in motion to cause the brushes 63 to be spread with respect to one another.

(B) Simultaneously therewith, motor 112, acting through belt 119 and pulleys 116 and 118 turns gear shaft 85 and gears 84 and 83 to rotate sleeve 70, thereby turning gear 69 which is keyed to sleeve 70 by set screw 71. Gear 69 is in mesh with pinion gears 68 mounted upon shaft 66, located within the tubular housings 52 and 53. A worm gear 65 secured to shaft 66 and in mesh with a second worm gear 64 drives shaft 62 and rotates brush 63.

The previous description shows how the several motions and operations are brought about. In order, the following sequence of mechanical movement is obtained. As the overhead structure or elevator 170 carrying forms 20 on frames 23 moves downwardly, brushes 63 rotatably supported upon tubular housings 52 and 53 are moved divergently to permit forms 20 to be lowered between the brushes 63. As forms 20 reach their lower-most position brushes 63 move convergingly (see paragraph "A") until they are in frictional contact with forms 20. (See paragraph "B".)

(C) Concurrently with the previously described operations belt 125 operating over pulleys 123 and 124 drives gears 126 and 128 and through gear 128 rotates all of the gears 88 which are in train, one gear 88 being associated with each bead forming unit 42. Gear 88 is secured to sleeve 86 by means of a set screw 89 thereby forcing rotation of sleeve 86 and spider 44 which is keyed thereto by means of set screw 87. Rotation of spider 44 carries the entire assembly of parts in unit 42 around the medial vertical axis of form 20.

It will thus be seen that as forms 20 are lowered the unit 42 is rotating around its axis and concurrently the brushes 63 are not only rotating on shaft 62 but are being moved divergently for reception or placement of the work.

As previously stated, as soon as the forms 20 reach their lower-most position rotating brushes 63 are permitted to contact forms 20, at which time elevator 170 starts to lift the frame 23 and forms 20 so that the brushes 63 rotating on shaft 62 and concurrently revolving about the medial vertical axis of form 20 will cause the film of rubber deposited on forms 20 to be rolled into an annular bead, (see paragraph "C") and the bead will continue to be formed as long as the rotating and revolving brushes are in contact with the film of rubber on form 20. After a predetermined amount of bead has been formed, the operation described in paragraph "A" again takes place and brushes 63 are moved divergently to permit the complete withdrawal of forms 20.

A new frame and set of forms 20 is then substituted for that which preceded, and the cycle of operation is then repeated.

In Figures 13 and 14, I show a modified form of construction designed to form an annular bead on goods of the character herein contemplated. The essential difference between this form of construction and that previously described, lies in the fact that here, I have substituted a belt 212 for brushes 63, which substitution involves a few minor changes in constructing the bead forming unit. Bevel gear 200 substitutes for gear 69 of the previous form of construction and is in mesh with gear 202 which drives shaft 204 journalled in brackets 206 and rotates pulleys 210 to drive bead forming belts 212 running over pulleys 214 mounted upon stub shafts 215 journalled in standards 216.

The standards 216 are oscillatable upon spiders 208 fixed to sleeve 224, and are joined by arms 246 and 248, pivoted to central shaft 240 in a manner analogous to that employed in the previously described structure.

Shaft 240 is bent to provide clearance of pulley shaft 204 due to the fact that cam 80 lifts shaft 240 a predetermined distance to effect spreading of standards 216 in a manner and for the purpose previously set forth in the description of the preferred form of structure.

It is not believed necessary to go to great length to describe the operation of this type of bead forming unit, for in all essentials it functions in a manner heretofore described, i. e., cam 80 alternately lifts shaft 240 to cause standards 216 to spread because of links 246 and 248. Gear shaft 85 rotating gears 84 and 83 turn sleeve 230 thereby rotating bevel gears 200 and 202 to drive pulleys 210 and belts 212.

Gear 69 operating through sleeve 224 provides means to rotate spider 208, carrying standards 216 and driven belts 212 around the medial vertical axis of forms 20. An idler 220 keeps belt 212 away from contact with the forms 20 at all points except one, which is, of course, the point at which the belt 212 is rolling the rubber film into an annular bead 261.

The belt 212 may be of leather, rubber or textile composition, or it may be of leather or rubber faced with a spongy or more resilient material than the body thereof, or it may have an outer facing of hair or bristle as a means of curling or rolling the rubber film 260 on forms 20 into an annular bead 261.

It will thus be seen that the machine of this invention is not only adapted to form an annular bead or ring on goods of the character contemplated, but that an indefinite number of articles may be processed simultaneously, more quickly, more easily and less expensively, than heretofore.

It is obvious that various changes and modifications and variations may be made in practicing the invention in departure from the particular showing of the drawings and description as given, without, however, departing from the true spirit of the invention as defined by the scope of the appended claims.

I claim:

1. In a machine to form annular beads around the open ends of thin rubber articles, a form to support said articles, rotating brushes in contact with said form and said article and means to revolve said rotating brushes around the medial vertical axis of said form, said brushes being supported upon tubular columns, and means to oscillate said columns whereby said brushes are intermittently brought into contact with said form and said article.

2. In a machine of the character described, means to form an annular bead around the open end of thin rubber articles, said means comprising a form on which said article is mounted, rotating brushes, said brushes being adapted to frictionally contact said form and said article, and means to constantly revolve said rotating brushes around the medial vertical axis of said forms, and supporting standards, said standards being adapted to support said rotating brushes, and means to oscillate said standards whereby said brushes are brought into intermittent contact with said form and said article.

3. In a machine employing a rotating element to process thin rubber articles, means to spread said element to permit placement of said articles for processing, means to cause said element to be placed for processing said articles, means to cause said element to rotatingly engage one end of said articles and to predeterminedly remain in frictional contact therewith, means to revolve said element in a circular path around said articles during processing, automatic means to predeterminedly spread said rotating element prior to withdrawal of said articles, and means to withdraw said articles from processing position.

4. In a machine employing a constantly rotating element to process thin rubber articles having an open end, synchronously operating means to move said articles into and from processing position, means operating in timed sequence to alternately spread said rotating element to a non-processing position and to return said element to position to process said articles, and constantly operating means to revolve said rotating element around the medial vertical axis of said articles.

5. In a machine to form annular beads on a thin rubber article having an open end, a table, a revolvable bead forming unit mounted on said table, rotating brushes on said unit, a form to support said article, said form being movable in vertical directions, means to move said brushes into bead forming contact with respect to said article, means to move said brushes from bead forming contact with said article, said brushes being operatively supported upon oscillatable standards, said unit, including said standards and said brushes being constantly rotated by means of planetary gears.

6. In a machine to form annular beads on a thin rubber article having an open end, a table, a revolvable bead forming unit rotatably mounted on said table, rotatable brushes on said unit, means to move said brushes into contact with said article, means to move said brushes from contact with said article, means to revolve said unit and said brushes around the medial vertical axis of said article concurrently with rotation of said brushes, and means to move said article to and from contact with said brushes in timed unison with operation of said bead forming unit.

7. In a machine employing a constantly rotating element to process a thin rubber article having an open end, synchronously operating means to move said article into and from processing position, cam operated means moving in timed sequence to alternately move said rotating element to a position to process said article and to subsequently move said element to a non-processing position, and means to constantly revolve said processing means around the medial vertical axis of said article.

8. In a machine employing a constantly rotating element to process thin rubber articles having an open end, synchronously operating means to move said articles into and from processing position, said means being an elevator adapted to move through a vertical path, means operated in timed sequence to alternately move said rotating element to a position to process said articles and to subsequently move said element to a non-processing position, and means to constantly revolve said processing means around the medial vertical axis of said articles.

9. In a machine to form annular beads on thin rubber articles, non-rotatable forms to support said articles in bead forming position, means to move said articles and forms in vertical directions, a table, bead forming units rotatably mounted on said table, said units having a spider, tubular standards oscillatable on said spiders, bead forming brushes rotatably mounted adjacent the top of said standards, a power source, means interposed between said power source and said brushes to transmit rotary motion to said brushes, means to alternately move said brushes to and from working contact with said articles, and means to constantly revolve said brushes around said articles.

10. In a machine to form annular beads on thin rubber articles, non-rotatable forms to support said articles in bead forming position, means to move said forms in vertical directions, a table, bead forming units rotatably mounted on said table, said units having a spider, standards oscillatable on said spider, bead forming brushes rotatably mounted adjacent the top of said standards, a power source, means interposed between said power source and said brushes to transmit rotary motion to said brushes, power means to operate a cam to move said brushes and standards laterally, means to subsequently move said brushes and standards to bead forming position, means to rotate said bead forming units around the medial vertical axis of said forms, and automatically operated means to control non-rotative movement of said forms.

11. A machine to form annular beads on rubber goods, a table, revolving bead forming units mounted on said table, said units having a base, oscillatable standards hinged to said base, rotatable brushes journaled in the upper extremity of said standards, a power source, means operating from said power source to rotate said brushes, power operated means to oscillate said standards in predetermined order, power operated means to constantly revolve said bead forming unit in bead forming position, forms to support said rubber goods, mechanical means to move said forms and goods to bead forming position, and power means to subsequently remove said goods after the bead forming operation.

12. A machine to form annular beads on rubber goods, a table, revolving bead forming units mounted on said table, said units having a base, oscillatable standards hinged to said base, rotatable brushes journaled in the upper extremity of said standards, a power source, means operating from said power source to rotate said brushes, power operated means to oscillate said standards in predetermined order, power operated means to constantly revolve said bead forming unit in bead forming position, forms to support said goods in bead forming position, elevator means to lower said forms and goods to a bead forming station, means to subsequently lift said goods during the bead forming operation, said elevator being controlled by hydraulic pressure.

13. In a machine to form annular beads on thin rubber articles, a bead forming element adapted to rotate, means to rotate said bead forming element, means to place said articles in bead forming position, means operating in timed sequence to bring said bead forming element into operative position with respect to said articles, means to effect rotation of said bead forming element around the medial vertical axis of said articles, means to cause said articles to move a vertically predetermined distance while in operative contact with said bead forming element, and means to remove said articles from bead forming position.

14. The combination in a machine to process thin rubber articles to form an annular bead around the open end of said articles, said machine employing processing means in rotation toward the medial vertical axis of said articles and concurrently rotating around said medial vertical axis while in operative contact with said articles, of means to predeterminedly move non-processed articles to processing position and to subsequently move processed articles from said machine, said means comprising a hydraulically actuated elevator.

15. In a machine of the character described, a bead forming unit, said unit having a base, standards oscillatable on said base, rotatable brushes adjacent the top of said standards, a shaft centrally aligned in said base, lateral arms joining said shaft and said standards, means to rotate said brushes, means to rotate said unit about its medial vertical axis, means to move said shaft vertically to spread said standards, and means to return said standards to normal position, all of said means being concurrently operable.

16. The combination with a mechanical form to support a thin rubber article during formation of an annular bead on said article, of means to form said bead, said means comprising brushes rotating in opposite directions and concurrently moving in a circular path around the medial vertical axis of said form and said article and in frictional contact therewith, and means operable in timed sequence to move said brushes from bead forming contact with said form and said article.

17. A bead forming machine comprising a table, bead forming units rotatably mounted on said table, said units comprising a base, oscillatable standards on said base, rotatable brushes on said standards, a central shaft, lateral arms joining said shaft and said standards, forms, an elevator to move said forms, hydraulic means to actuate said elevator, motor driven cam operated means to lift said central shaft, spring means to return said shaft, a motor driven train of gears to rotate said unit around its medial vertical axis, a motor driven gear shaft, a sleeve, a gear wheel, a second gear wheel, vertical rotatable shafts, a worm gear on each of said shafts, a shaft to support each of said brushes, a worm gear on said shaft and in mesh with said first mentioned worm gear, a second cam, and means operatively connecting said second cam to operate a valve to admit fluid under pressure to actuate said hydraulic means.

STANLEY S. MILLEN.